United States Patent [19]
Grile

[11] Patent Number: 5,345,520
[45] Date of Patent: Sep. 6, 1994

[54] ELECTRICAL CONNECTOR WITH AN OPTICAL FIBER CONNECTION DETECTOR

[76] Inventor: Mark E. Grile, 2710 Redbud La., Anderson, Ind. 46011

[21] Appl. No.: 98,193
[22] Filed: Jul. 28, 1993
[51] Int. Cl.⁵ .......................... G02B 6/00; G02B 6/36
[52] U.S. Cl. ...................................... 385/15; 439/207; 439/188; 439/577
[58] Field of Search ........................ 385/15, 53, 54, 55, 385/59, 73, 66, 88, 147; 439/188, 489, 490, 817, 207, 208, 210, 211, 488, 577

[56] References Cited

U.S. PATENT DOCUMENTS

| | | | |
|---|---|---|---|
| 4,405,233 | 9/1983 | Grau | 356/237 |
| 4,678,264 | 7/1987 | Bowen et al. | 385/88 |
| 4,721,358 | 1/1988 | Faber et al. | 439/817 |
| 4,896,939 | 1/1990 | O'Brien | 385/88 |
| 4,902,244 | 2/1990 | Endo et al. | 439/489 |
| 4,915,648 | 4/1990 | Takase et al. | 439/490 |
| 4,925,402 | 5/1990 | Inaba et al. | 439/490 |
| 5,140,659 | 8/1992 | Minds et al. | 385/66 |
| 5,169,329 | 12/1992 | Taguchi | 439/188 |

*Primary Examiner*—Akm E. Ullah
*Attorney, Agent, or Firm*—Woodard, Emhardt, Naughton, Moriarty & McNett

[57] ABSTRACT

Optical fibers are embedded within the center portions of the male and the female elements of the connector. The tail ends of the embedded optical fibers exit the male and female elements on corresponding side portions thereof. The one ends of the optical fibers are disposed such that when the male and female elements are mated to establish electrical contact, the other ends of the optical fibers embedded within each element become properly aligned and are brought into contact thereby providing a path for a light signal to pass between them. A light source applied to one of the tail ends of the optical fibers exiting either of the electrically connected elements will then pass to the tail end of the optical fiber exiting the other element, thereby evidencing that the electrical connection between the elements is good.

3 Claims, 1 Drawing Sheet

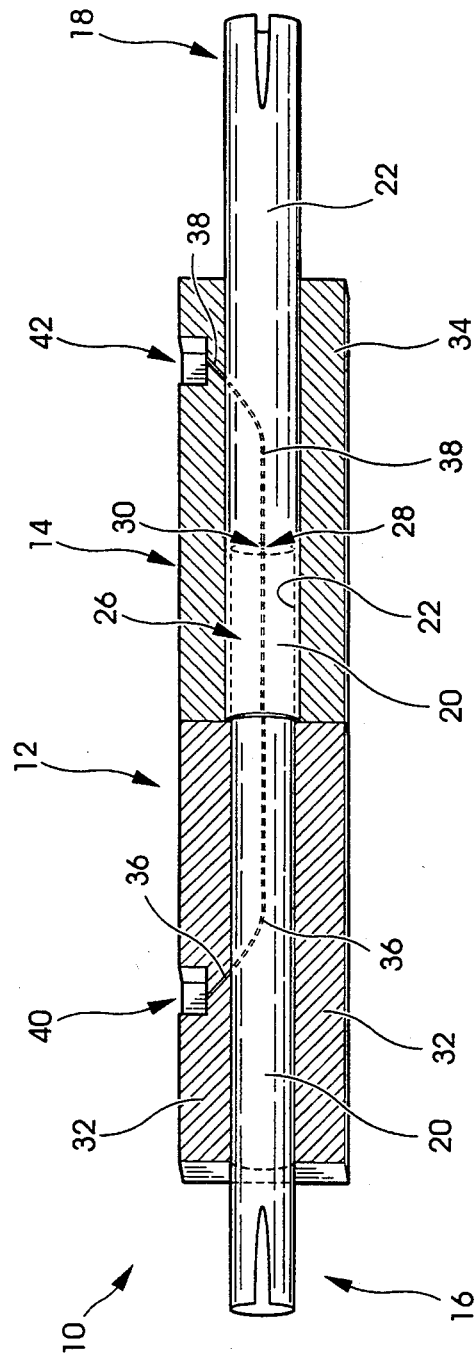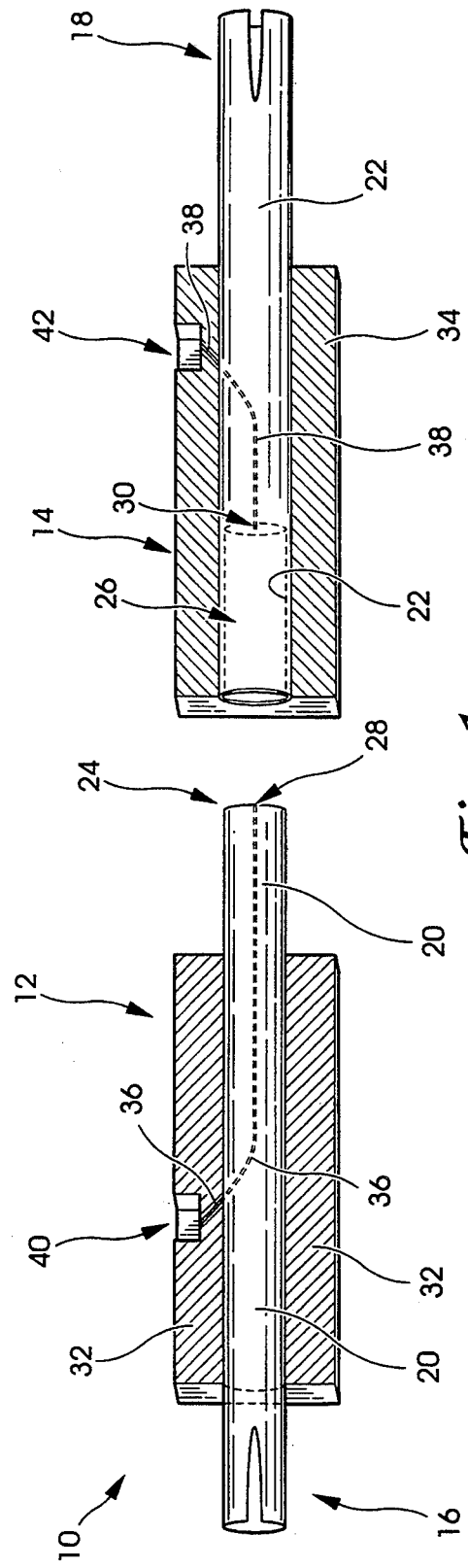

ELECTRICAL CONNECTOR WITH AN OPTICAL FIBER CONNECTION DETECTOR

BACKGROUND OF THE INVENTION

The present invention relates generally to the field of electrical connectors, and more specifically to an electrical connector that utilizes optical fiber to detect a fitted electrical contact between the male and female elements thereof.

SUMMARY OF THE INVENTION

The electrical connector of the present invention utilizes optical fiber to detect a fitted electrical contact between the male and female connector elements thereof. In the preferred embodiment to date, optical fibers are embedded within the center portions of the male and the female elements of the connector. The tail ends of the embedded optical fibers exit the male and female elements on corresponding side portions thereof. The other ends of the optical fibers are disposed such that when the male and female elements are mated to establish electrical contact, the other ends of the optical fibers embedded within each element become properly aligned and are brought into contact thereby providing a path for a light signal to pass between them. A light source applied to one of the tail ends of the optical fibers exiting either of the electrically connected elements will then pass to the tail end of the optical fiber exiting the other element, thereby evidencing that the electrical connection between the elements is good.

Optical fiber is very sensitive, and the ends of a pair of optical fibers must be properly aligned in order to provide a path for a light signal. Therefore, since the ends of the optical fibers make contact only after the electrical connection is made, if light can pass through the mated optical fiber ends, then a technician will know that the electrical connection has been made good.

Optical fiber is a dielectric, therefore a test of the electrical connection made by the connector of the present invention can be made while the technician stays isolated from the electrical circuit. Also, by utilizing optical fibers to test the connection made between the male and female elements of the electrical connector of the present invention, testing the connector for proper connection will not load, inject a signal into, add noise, or otherwise expose the accompanying electrical circuit to any outside elements, all of which are obvious advantages.

One embodiment of the electrical connector of the present invention is an electrical connector with an optical fiber connection detector, comprising a male connector element having a first end, a second end, and a male electrical conduit disposed therebetween; a female connector element having a first end, a second end, and a female electrical conduit disposed therebetween; receptors at the first ends of the male and female connector elements in electrical communication with the male and female electrical conduits whereby the male and female elements are electrically engaged with whatever is to be electrically connected by the male and female connector elements; a male member at the second end of the male connector element in electrical communication with the male electrical conduit and a female member at the second end of the female connector element in electrical communication with the female electrical conduit, the male and female members being correspondingly sized to be matingly received together and defining a fitted electrical contact between the male and female members when the distal most end portion of the male member is abutted against the proximal most end portion of the female member; and a first optical fiber embedded within the male connector element having a first end that exits the male connector element between the first and second ends thereof and a second end that exits the male member at its distal most end portion, and a second optical fiber embedded within the female connector element having a first end that exits the female connector element between the first and second ends thereof and a second end that exits the female member at its proximal most end portion, whereby the second ends of the first and second optical fibers are sufficiently aligned and abutted together when the male and female members are in fitted electrical contact that a light signal will pass between the second ends of the first and second optical fibers.

Another embodiment of the electrical connector of the present invention is an electrical connector with an optical fiber connection detector, comprising a male connector element having a first end, a second end, and a male electrical conduit disposed therebetween; a female connector element having a first end, a second end, and a female electrical conduit disposed therebetween, the female connector element being sized to matingly receive the male connector element and defining a fitted electrical contact between the male and female electrical conduits when the male connector element is matingly received by and is abutted against the female connector element; and a first optical fiber embedded within the male connector element having a first end that exits the male connector element between the first and second ends thereof and a second end that exits the male connector element at a point of abutment between the male and female connector elements when there is a fitted electrical contact between the male and female electrical conduits, and a second optical fiber embedded within the female connector element having a first end that exits the female connector element between the first and second ends thereof and a second end that exits the female connector element at a point of abutment between the male and female connector elements when there is a fitted electrical contact between the male and female electrical conduits corresponding to the point at which the second end of the first optical fiber exits the first connector element, whereby the second ends of the first and second optical fibers are sufficiently aligned and abutted together when the male and female electrical conduits are in fitted electrical contact that a light signal will pass between the second ends of the first and second optical fibers.

Another embodiment of the electrical connector of the present invention is a method for testing for a fitted electrical contact between the two parts of an electrical connector utilizing an optical fiber, comprising the steps of providing a two part electrical connector having an optical fiber in each part, a first end of each of the optical fibers in each of the parts exiting each part at a location that is accessible to a light source when the two parts of the electrical connector are connected together, and the second end of each of the optical fibers in each of the parts exiting each part at a location that will align and abut the second ends of each of the optical fibers in each of the parts when the two parts of the electrical connector are in fitted electrical contact whereby a light signal will pass between the second ends of the optical fibers; connecting the two parts of the connector; and testing for the presence of a fitted electrical contact by sending a light signal into the first end of one of the optical fibers in one of the two parts of the connector and monitoring the first end of the optical fiber in the other part of the connector for the light signal.

Other objects and advantages of the present invention will be evident from the descriptions that follow.

BRIEF DESCRIPTION OF THE DRAWINGS

FIG. 1 is a partially segmented side view of the disconnected male and female halves of a preferred embodiment of the electrical connector of the present invention having an optical fiber connection detector.

FIG. 2 is a partially segmented, side view of the connected male and female halves of the electrical connector of FIG. 1 shown in electrical contact.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings, FIG. 1 illustrates a partially segmented, side view of the disconnected male and female halves 12 and 14, respectively, of a preferred embodiment of the electrical connector 10 of the present invention. FIG. 1 is an illustration of a single electrical connector 10, but it is to be understood that the scope of the present invention is not limited to a single electrical connector. Any number of single electrical connectors 10 of the present invention may be grouped together, side-by-side, to form a multi-pin electrical connector, each having optical fiber to detect a fitted condition between the male and female connector elements thereof, and still be within the scope of the present invention.

Referring still to FIG. 1, electrical connector 10 has a conventional male element 12 and a conventional female element 14, which when mated together (as illustrated in FIG. 2), allow an electric current to pass through the connector 10. Male element 12 and female element 14 of electrical connector 10 are provided with a male electrical conduit 20 and a female electrical conduit 22, respectively. At a first end of both the male and female electrical conduits 20 and 22 are receptors 16 and 18, respectively, that electrically engage the electrical wire pairs that are to be connected by the connector 10. The receptors 16 and 18 illustrated in FIGS. 1 are of conventional crimp construction, but any number of conventional receptors would be suitable, provided that they electrically engage the electrical wire pairs to be connected by the connector 10 and hold them in place. At the opposite second ends of both the male and female electrical conduits 20 and 22 are male and female members 24 and 26, respectively, sized to be matingly received together to establish an electrical contact between male and female conduits 20 and 22.

Referring now to FIG. 2, when the male and female members 24 and 26 are fully mated and thus fitted together, the distal end portion 28 of male member 24 abuts the proximal end portion 30 of female member 26, thereby making good the fitted electrical connection between the male and female conduits 20 and 22.

Male and female conduits 20 and 22 are each provided with conventional dielectric bodies 32 and 34, respectively, which are shown in section in FIGS. 1 and 2.

Referring now to both FIGS. 1 and 2, the electrical connector 10 of the present invention utilizes optical fibers 36 and 38 to detect a fitted condition between the male and female connector elements 12 and 14 thereof. In the preferred embodiment to date, optical fibers 36 and 38 are embedded within the center portions of the male and the female conduits 20 and 22 of the connector 10. The tail ends 40 and 42 of the embedded optical fibers 20 and 22 exit the dielectric bodies 32 and 34 of the male and female elements 12 and 14 on corresponding side portions thereof. In FIGS. 1 and 2, the tail ends 40 and 42 of optical fibers 36 and 38 are illustrated exiting from the corresponding top side portions of the dielectric bodies 32 and 34. The opposite ends of the optical fibers 36 and 38 are disposed within the center portions of male and female conduits 20 and 22 and exit the distal end portion 28 of male member 24 and the proximal end portion 30 of female member 26 such that when the male and female conduits 20 and 22 are mated to establish a fitted electrical contact, the ends of the optical fibers embedded within each conduit 20 and 22 become properly aligned and come into contact to provide a path for a light signal to pass between optical fibers 36 and 38. Therefore, a testing light source applied to either one of the tail ends 40 or 42 of the optical fibers 36 or 38 exiting the dielectric bodies 32 and 34 will then pass to the other optical fiber tail end 42 or 40, thereby evidencing that the male and female conduits 20 and 22 have been fully mated and are in a maximum fitted condition, meaning the electrical connection between the connector elements 12 an 14 elements is therefore good.

Any number of connectors 10 of the present invention may be grouped together to form one multi-pin unit. Such an arrangement would allow optical testing of several connectors at once (a RS232 connection, for example), with a light source test plug that would send and receive light signal pulses across the tail ends of the optical fibers exiting the dielectric bodies above each one of the plurality of mated electrical conduits.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An electrical connector utilizing an optical fiber to detect a fitted electrical contact comprising:
   a male connector element having a first end, a second end, and a male electrical conduit disposed therebetween;
   a female connector element having a first end, a second end, and a female electrical conduit disposed therebetween;

receptors at the first ends of said male and female connector elements in electrical contact with said male and female electrical conduits a male member at the second end of said male connector element in electrical communication with said male electrical conduit and a female member at the second end of said female connector element in electrical communication with said female electrical conduit, said male and female members being correspondingly sized to be matingly received together and defining a fitted electrical contact between said male and female members when the distal most end portion of the male member is abutted against the proximal most end portion of the female member;

a first optical fiber embedded within said male connector element having a first end that exits said male connector element between the first and second ends thereof and a second end that exits said male member at its distal most end portion, and a second optical fiber embedded within said female connector element having a first end that exits said female connector element between the first and second ends thereof and a second end that exits said female member at its proximal most end portion, whereby the second ends of said first and second optical fibers are aligned and abutted together when said male and female members are in fitted electrical contact and a light signal will pass between the second ends of said first and second optical fibers.

2. An electrical connector utilizing an optical fiber to detect a fitted electrical contact comprising:

a male connector element having a first end, a second end, and a male electrical conduit disposed therebetween;

a female connector element having a first end, a second end, and a female electrical conduit disposed therebetween, said female connector element being sized to matingly receive said male connector element and defining a fitted electrical contact between said male and female electrical conduits when the male connector element is matingly received by and is abutted against said female connector element;

a first optical fiber embedded within said male connector element having a first end that exits said male connector element between the first and second ends thereof and a second end that exits said male connector element at a point of abutment between said male and female connector elements when there is a fitted electrical contact between said male and female electrical conduits, and a second optical fiber embedded within said female connector element having a first end that exits said female connector element between the first and second ends thereof and a second end that exits said female connector element at a point of abutment between said male and female connector elements when there is a fitted electrical contact between said male and female electrical conduits corresponding to the point at which said second end of said first optical fiber exits said first connector element, whereby the second ends of said first and second optical fibers are aligned and abutted together when said male and female electrical conduits are in fitted electrical contact and a light signal will pass between the second ends of said first and second optical fibers.

3. A method for testing for a fitted electrical contact between the two parts of an electrical connector utilizing an optical fiber, comprising the steps of:

providing a two part electrical connector having an optical fiber in each part, a first end of each of the optical fibers in each of the parts exiting each part at a location that is accessible to a light source when the two parts of the electrical connector are connected together, and the second end of each of the optical fibers in each of the parts exiting each part at a location that will align and abut the second ends of each of the optical fibers in each of the parts when the two parts of the electrical connector are in fitted electrical contact whereby a light signal will pass between the second ends of the optical fibers;

connecting the two parts of the connector;

testing for the presence of a fitted electrical contact by sending a light signal into the first end of one of the optical fibers in one of the two parts of the connector and monitoring the first end of the optical fiber in the other part of the connector for said light signal.

* * * * *